US007917178B2

(12) United States Patent
Watson (10) Patent No.: US 7,917,178 B2
(45) Date of Patent: Mar. 29, 2011

(54) WIRELESS COMMUNICATIONS DEVICE WITH VOICE-TO-TEXT CONVERSION

(75) Inventor: Brian D. Watson, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 574 days.

(21) Appl. No.: 11/086,940

(22) Filed: Mar. 22, 2005

(65) Prior Publication Data

US 2006/0217159 A1    Sep. 28, 2006

(51) Int. Cl.
*H04B 1/38* (2006.01)
*H04W 4/00* (2009.01)
*G10L 15/26* (2006.01)

(52) U.S. Cl. ....... 455/563; 455/426.1; 345/2.3; 704/235

(58) Field of Classification Search .......... 455/566, 455/414.1, 3.06, 414.4, 466; 445/414.4; 235/492; 704/235, 15.04, 13.011, 276, 9; 379/88.14; 345/2.3, 473
See application file for complete search history.

(56) References Cited

U.S. PATENT DOCUMENTS

| | | | |
|---|---|---|---|
| 6,377,822 B1 * | 4/2002 | Grimes | 455/566 |
| 6,507,643 B1 * | 1/2003 | Groner | 379/88.14 |
| 6,775,651 B1 * | 8/2004 | Lewis et al. | 704/235 |
| 2003/0081739 A1 | 5/2003 | Hikishima | |
| 2003/0097262 A1 * | 5/2003 | Nelson | 704/235 |
| 2003/0157968 A1 | 8/2003 | Boman et al. | |
| 2004/0085259 A1 * | 5/2004 | Tarlton et al. | 345/2.3 |
| 2004/0109541 A1 | 6/2004 | Celi, Jr. et al. | |
| 2005/0013419 A1 | 1/2005 | Pelaez et al. | |
| 2005/0048992 A1 * | 3/2005 | Wu et al. | 455/466 |
| 2005/0255837 A1 * | 11/2005 | Kwon | 455/414.4 |
| 2005/0273327 A1 * | 12/2005 | Krishnan | 704/235 |
| 2006/0016896 A1 * | 1/2006 | Grupp | 235/492 |

FOREIGN PATENT DOCUMENTS

| | | |
|---|---|---|
| EP | 1313298 | 5/2003 |
| JP | 2003174680 | 6/2003 |
| WO | WO 03/071774 | 8/2003 |
| WO | WO 2004/054213 | 6/2004 |

OTHER PUBLICATIONS

Annex to Form PCT/ISA/206 Communication Relating to the Results of the Partial International Search, PCT/US2005/034914, Mailed: Feb. 14, 2006.
PCT International Search Report, International Application No. PCT/US2005/034914, Mailed on Apr. 6, 2006.

* cited by examiner

*Primary Examiner* — Charles N Appiah
*Assistant Examiner* — Kiet Doan
(74) *Attorney, Agent, or Firm* — Coats & Bennett, P.L.L.C.

(57) ABSTRACT

A wireless communications device includes a receiver that transmits and receives speech signals to and from a remote party via a wireless communications network. The received speech signals include information representative of one or more audible sounds associated with the remote party. The audible sounds may be, for example, words uttered by the remote party, or a predetermined audio message associated with the remote party. A speech processing unit in the user's device converts the received speech signals into corresponding text based on an operating mode of the wireless communications device. The converted text is then displayed to the user on a display. Alternatively, the remote party's wireless communication device or a network entity may convert speech to text for transmission to the user based on an indicated operating mode of the wireless communications device associated with the user.

21 Claims, 8 Drawing Sheets

WIRELESS COMMUNICATIONS DEVICE WITH VOICE-TO-TEXT CONVERSION

BACKGROUND

The present invention relates generally to wireless communications devices, and particularly to wireless communications devices having voice-to-text capabilities.

Wireless communications devices are typically equipped to provide a user with a wide array of communication services. Perhaps two of the most popular services are voice communications and text messaging. With these services, a sending party's wireless communications device modulates information (i.e., either the user's voice or an alphanumeric message) onto a carrier signal for transmission to a remote party. Upon receipt, the remote party's device either renders the sender's voice as audible sound, or sends the alphanumeric message to a display. In either case, two parties may communicate with each other with ease and relative reliability.

However, there are scenarios where the use of these services are problematic. For example, a receiving party may have a difficult time hearing a sending party's voice in a noisy environment, or may be in a setting that is not particularly conducive to voice communications (e.g., in church or at a meeting). In these cases, text messaging provides the receiving party at least some relief as it does not require the use of a speaker. Entering long messages, however, is cumbersome. Therefore, a sending party may not be inclined to use text messaging for anything other than very short messages (e.g., "Call me later"). In such scenarios, important communications may be delayed until the receiving party can establish a voice connection in a quieter environment. What is needed is a system and method that allows a receiving party to adapt his wireless communications device to operate in such environments without requiring the sending party to manually enter long alphanumeric messages.

SUMMARY

The present invention provides a system and method that permits a user of a wireless communications device to "read" on a display what a remote party is saying during a conversation. In one embodiment, the wireless communications device comprises a receiver, a speech processor, memory, and a controller. The receiver receives a speech signal transmitted by the remote party. Upon receipt of the signal, the controller determines a current operating mode of the user's device. If the device is operating in an audible mode, the controller renders the received signal through a speaker. If the device is operating in a voice-to-text conversion mode, the controller controls the speech processor to convert the speech signals to corresponding text. The corresponding text is then sent to the display for the user.

In an alternate embodiment, a server in the wireless communications network receives and analyzes the speech signal transmitted by the remote party. Speech processing logic associated with the server converts the speech signals to corresponding text. The server then sends the corresponding text to the remote party's wireless communications device for display to the user.

In another alternate embodiment, a wireless communications device associated with the remote party receives an indication over an air interface that indicates the current operating mode of the user's device. Based on this indication, a speech processor in the remote party's device converts speech signals to corresponding text prior to transmission to the user.

The controller may also be configured to selectively place the user's wireless communications device in and out of the voice-to-text conversion mode responsive to manual commands input by the user, or automatically responsive to a measured ambient noise level. Alternatively, the controller may be configured to select the operating mode responsive to a control signal received over the air interface. The wireless communications device may also include an indicator that apprises users of the current operating mode of the remote parties.

DETAILED DESCRIPTION

Figure 1:
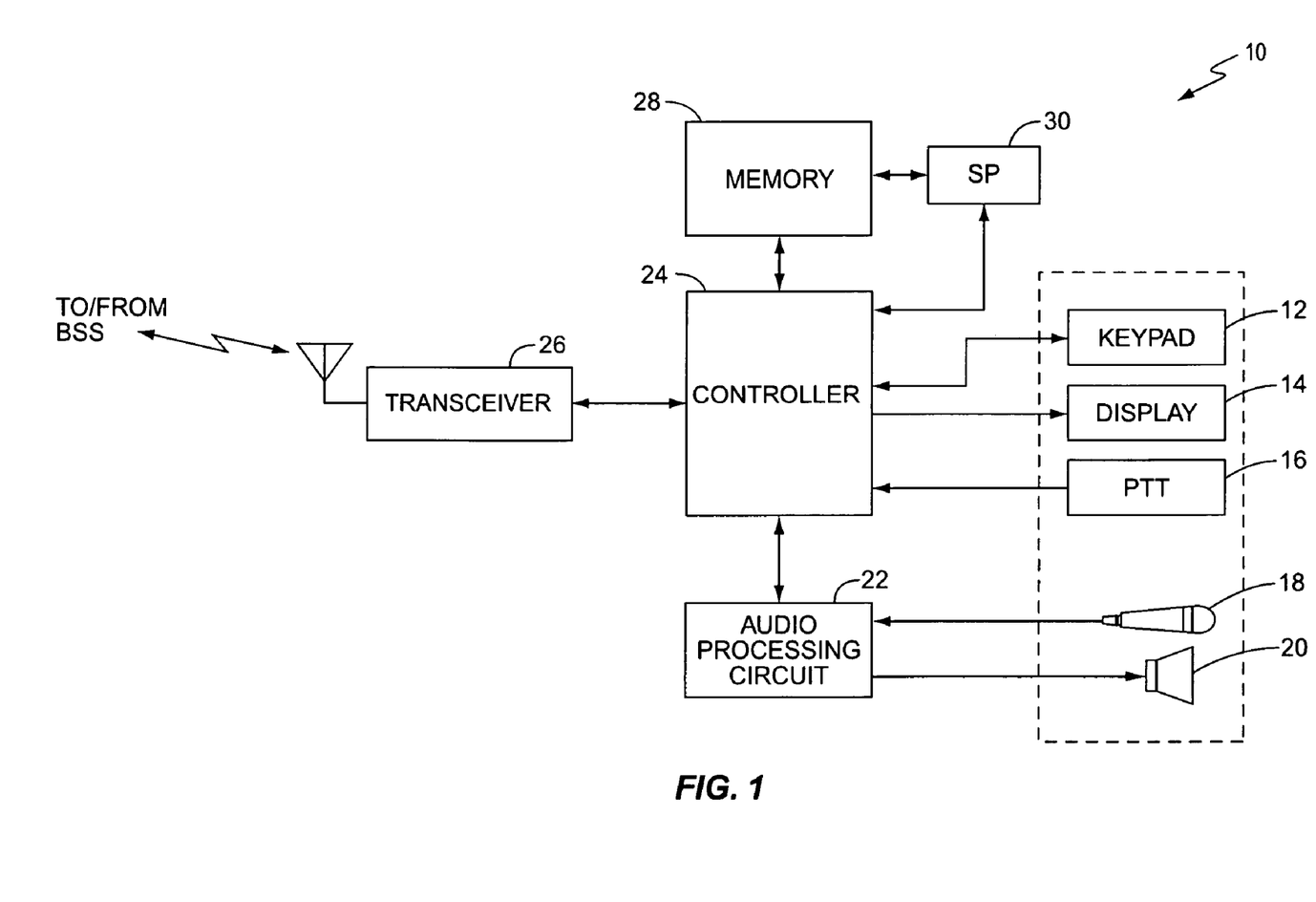
FIG. 1 illustrates a wireless communications device configured according to one embodiment of the present invention.

Referring now to FIG. 1, a wireless communications device configured according to one embodiment of the present invention is shown therein and indicated generally by the number 10. The figures and the specification relate to the present invention in terms of a cellular telephone; however, those skilled in the art will readily appreciate that this is for illustrative purposes only. The present invention is applicable to any consumer electronics device having communications capabilities including, but not limited to, Personal Digital Assistants (PDA), palm or laptop computers, satellite phones, and the like.

As seen in FIG. 1, wireless communications device 10 comprises a user interface having a keypad 12, a display 14, a microphone 18, and a speaker 20. In embodiments where wireless communications device 10 operates in a half-duplex system, the user interface could also include a Push-To-Talk (PTT) button 16.

Keypad 12, which may be disposed on a front face of wireless communications device 10, includes an alphanumeric keypad and other controls such as a joystick, button controls, or dials. Keypad 12 permits the user to dial telephone numbers, enter commands, and select menu options. Display 14 allows the operator to see the dialed digits, images, called status, menu options, and other service information. As will be described in more detail below, text corresponding to the spoken words of a remote party may be shown on display 14 when device 10 is in a voice-to-text operating mode. In some embodiments of the present invention, display 14 comprises a touch-sensitive screen that displays text and images, and accepts user input.

The wireless communications device 10 of the present invention may operate in a full-duplex mode, a half-duplex mode, or both. When wireless communications device 10 operates in a full-duplex mode, the user can speak to and hear the remote party simultaneously. This is not the case when wireless communications device 10 operates in a half-duplex mode. More particularly, the user can either speak to the remote party or hear the remote party in the half-duplex mode, but not both simultaneously. To speak with the remote party in the half-duplex mode, the user must depress PTT button 16. However, to hear audio from the remote party through speaker 20, the user must release PTT button 16.

Microphone 18 converts the user's speech into electrical audio signals, and passes the signals to an audio processing circuit 22. These signals may be modulated for transmission to a base station in a wireless communications network. When device 10 is in an audible operating mode, the signals received from the network are processed by audio processing circuit 22 and rendered through speaker 20 for the user. Conversion of speech into electrical signals, and of electrical signals into audio for the user, may be accomplished by any audio processing circuit known in the art.

Controller 24 controls the operation of wireless communications device 10 according to program instructions stored in memory 28. The control functions may be implemented in a single microprocessor, or in multiple microprocessors. For example, suitable microprocessors may include both general purpose and special purpose microprocessors and digital signal processors. As those skilled in the art will readily appreciate, memory 28 and controller 24 may be incorporated into a specially designed application-specific integrated circuit (ASIC). As discussed in more detail later, controller 24 may be configured to place wireless communications device 10 into an appropriate operating mode either automatically or responsive to manual commands input by the user.

Transceiver 26 is a fully functional cellular radio transceiver that may transmit and receive signals in a wireless communications network. Transceiver 26 may transmit and receive both voice and packet data. Transceiver 26 may also operate in either a full-duplex or a half-duplex mode, depending upon the system within which wireless communications device 10 operates. Transceiver 26 may operate according to any known standard, including but not limited to the standards known generally as the Global System for Mobile Communications (GSM), General Packet Radio Service (GPRS), Code Division Multiple Access (CDMA), and the like.

Memory 28 represents the entire hierarchy of memory in wireless communications device 10, and may include both random access memory (RAM) and read-only memory (ROM). Executable program instructions and data required for operation of wireless communications device 10 are stored in non-volatile memory, such as EPROM, EEPROM, and/or flash memory, which may be implemented as, for example, discrete or stacked devices.

The present invention permits a user to communicate with one or more remote parties when the user is located in an environment that is not particularly conducive to voice communications. For example, a user in a noisy environment such as a stadium may have difficulty hearing what a remote party is saying. Alternatively, the user may be in a church or meeting where noise interruptions would be disfavored. According to the present invention, the user in such an environment may place his device 10 in a voice-to-text operating mode, while the remote party continues to speak into his microphone normally. Upon receiving the remote party's transmitted signal, the user's device 10 analyzes the signal. Rather than rendering it through speaker 20 as audible sound, controller 24 displays the remote party's transmission as words on display 14. That is, instead of the user hearing the remote party over speaker 20, the user "reads" on display 14 what the remote party is actually saying.

To accomplish this, one embodiment of the present invention comprises a speech processor 30 that interfaces with controller 24 and memory 28. Generally, any speech processor known in the art may be used with the present invention; however, in one embodiment, speech processor 30 comprises a speaker-independent speech recognition system. Signals received from one or more remote parties are demodulated as is known in the art to produce a signal indicative of the acoustic utterances of the remote party. Speech processor 30 analyzes this signal and converts the signal to corresponding text. Controller 24 then sends this text to display 14. In this manner, the user of wireless communications device 10 located in a noisy or quiet environment can "read" on display 14 what the remote party is saying.

Figure 2A:
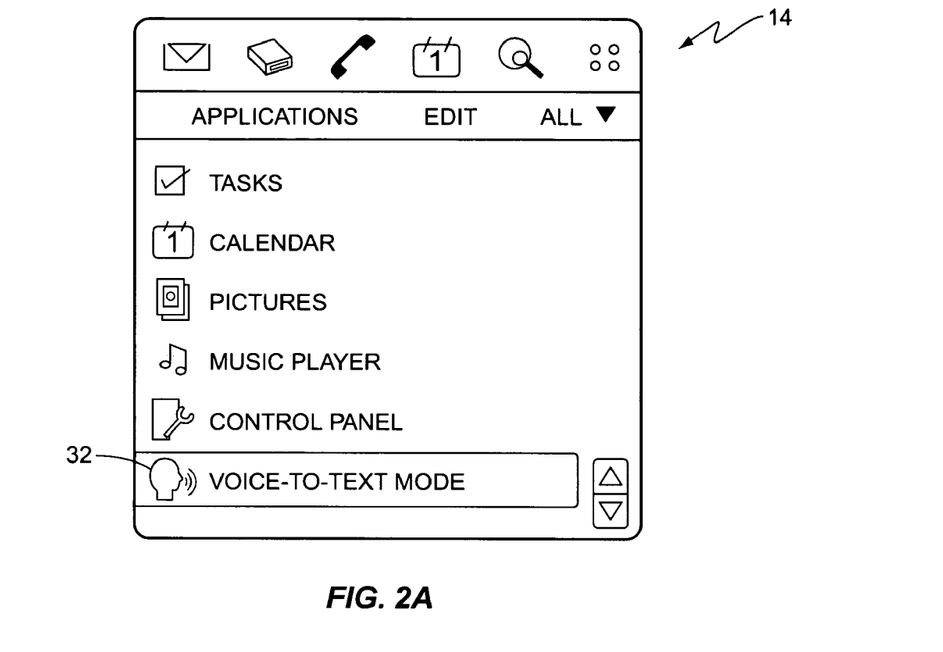
FIGS. 2A-2B illustrate a menu system according to one embodiment of the present invention that permits a user to manually place the wireless communications device in a selected operating mode.
Figure 2B:
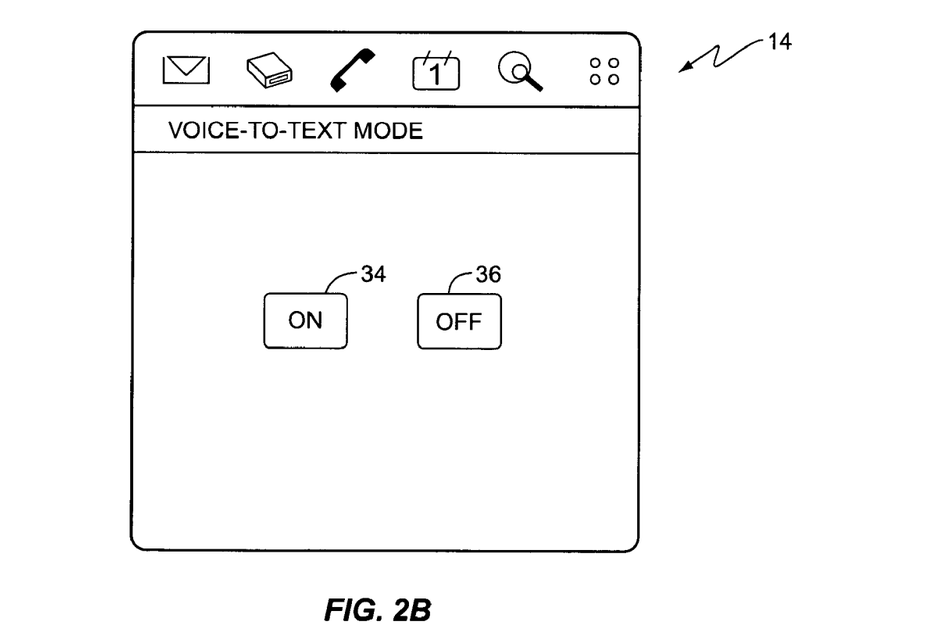
Figure 3:
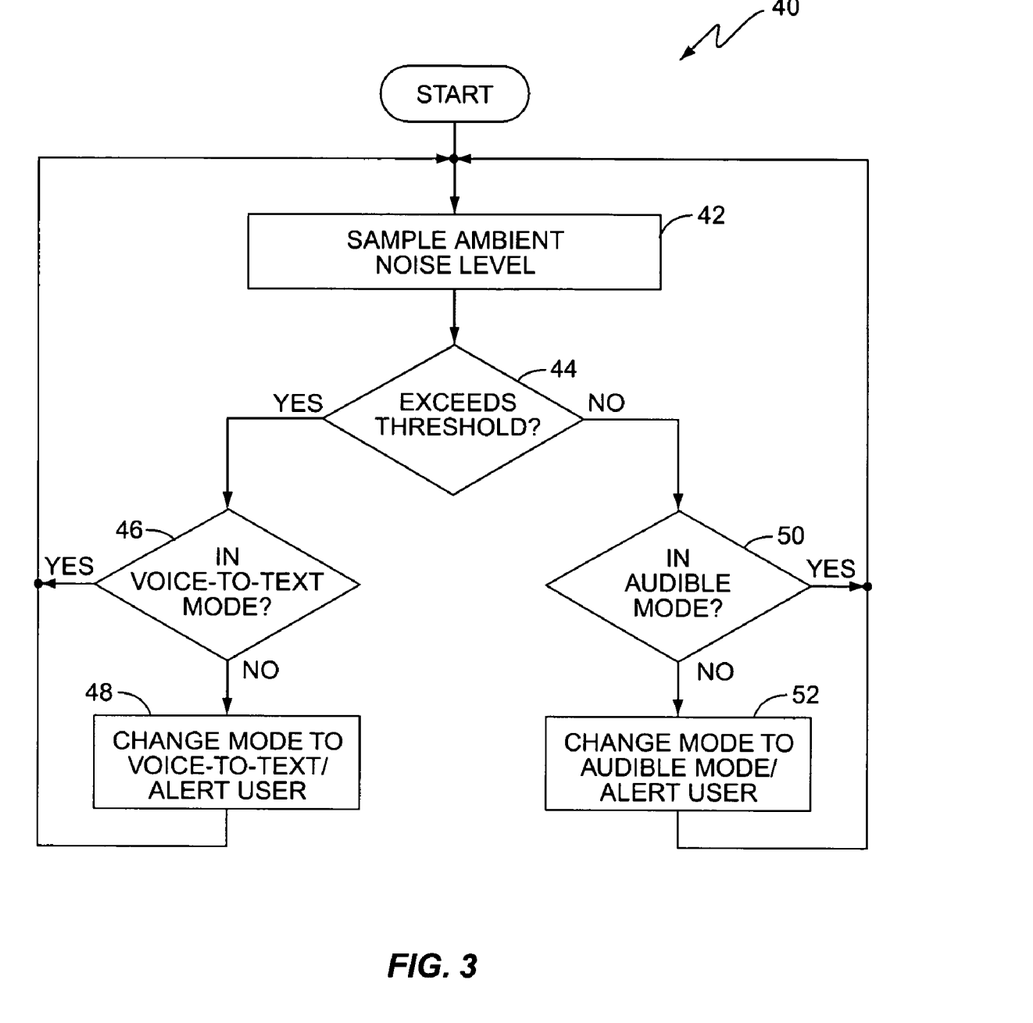
FIG. 3 illustrates a method according to one embodiment of the present invention by which the wireless communications device automatically selects an appropriate operating mode.
Figure 4:
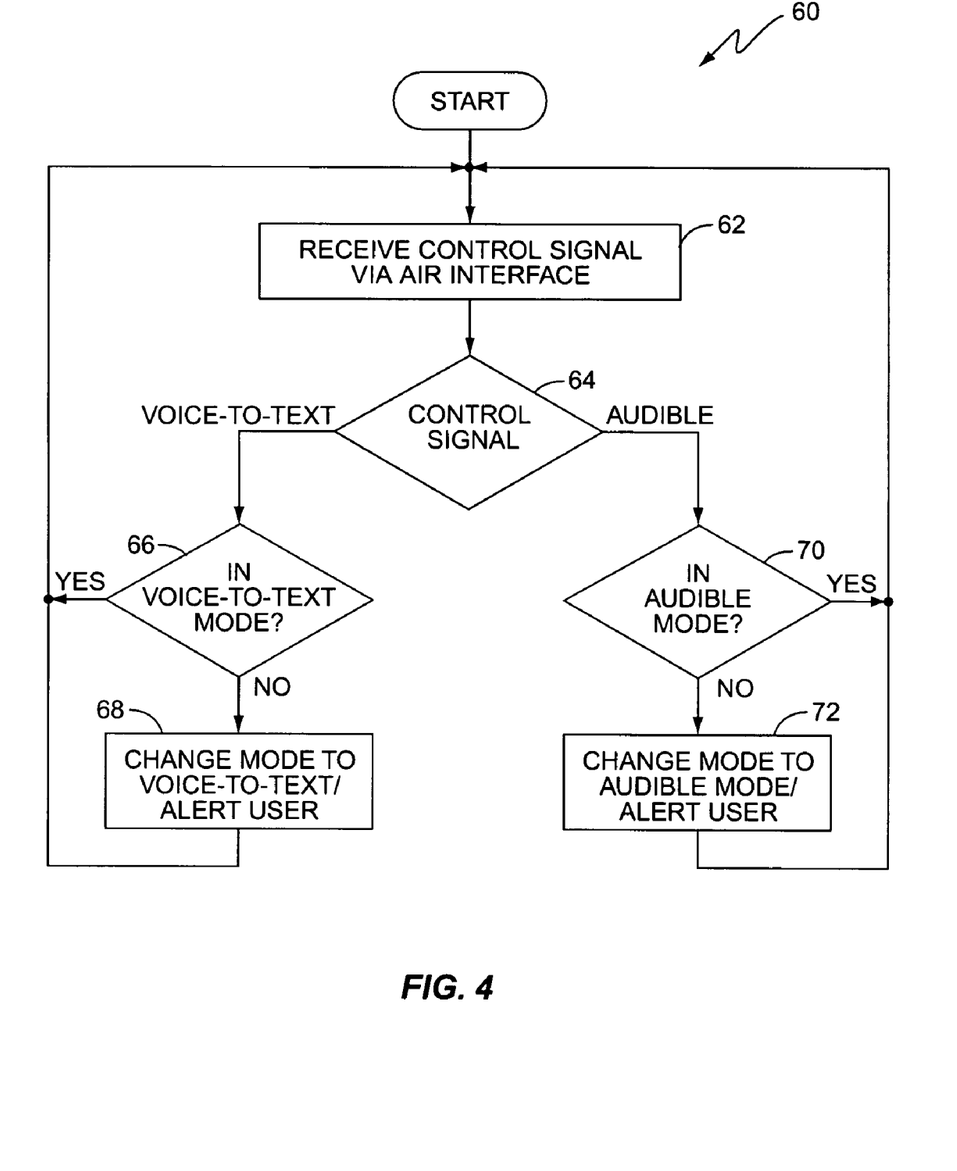
FIG. 4 illustrates a method according to an alternative embodiment of the present invention by which the wireless communications device automatically selects an appropriate operating mode.

As seen in FIGS. 2-4, wireless communications device 10 may be placed in and out of the voice-to-text mode either manually (FIGS. 2A-2B), or automatically (FIGS. 3-4). In FIG. 2A, the user accesses a menu and selects menu option 32 on display 14. A subsequent screen seen in FIG. 2B may be launched in which the user enables or disables the operating mode. That is, selecting an "ON" control button 34 places device 10 in the voice-to-text conversion mode, while selecting the "OFF" control button 36 places the device 10 into the audible mode.

In FIG. 3, an automatic method 40 of selecting the operating mode is shown. Particularly, controller 24 may be configured to periodically enable microphone 18 to sample the ambient noise level in the ambient environment (box 42). Controller 24 may then compare the sampled noise level to a predetermined threshold (box 44). If exceeded, controller 24 will place device 10 in the voice-to-text operating mode and/or alert the user (box 48), provided that device 10 is not already in the voice-to-text operating mode (box 46). If the threshold is not exceeded, controller 24 will place device 10 in the audible mode and/or alert the user (box 52) if device 10 is not already in the audible mode (box 50). The threshold may be adjusted by the user.

FIG. 4 illustrates an alternate method 60 of placing the receiver's wireless communication device 10 into an appropriate operating mode. In this embodiment, the receiving party could receive a control signal over the air interface (box 62). The control signal may originate from either the sending party or from a server in the wireless communications network. For example, the control signal may be an indication, such as a bit or series of bits, received with call set-up messages. Controller 24 could test the control signal (box 64) to determine if the receiver's device 10 should enter the voice-to-text mode (box 68), provided that device 10 is not already in the voice-to-text operating mode (box 66), or the audible mode (box 72) if device 10 is not already in the audible mode (box 70).

Figure 5:
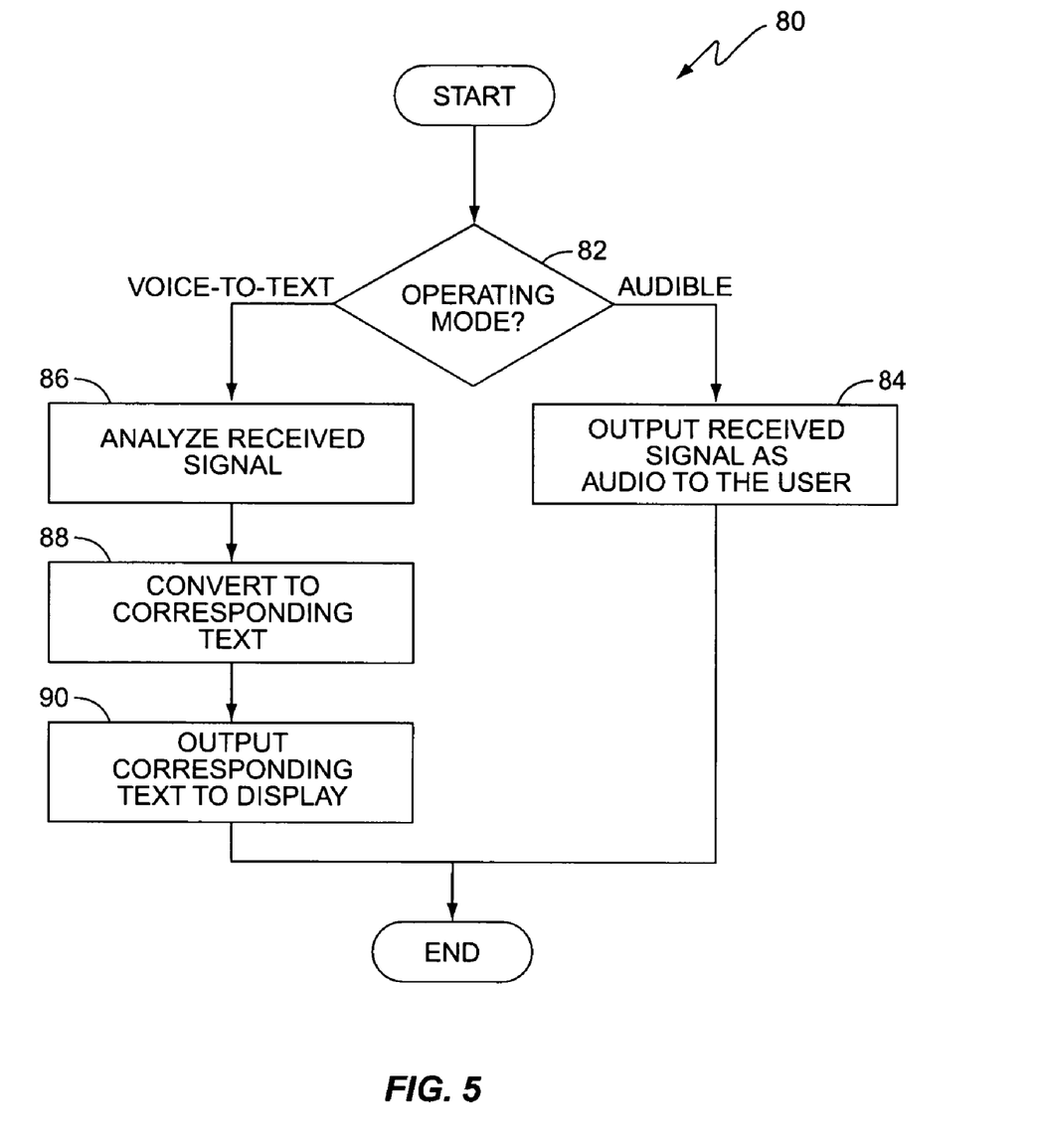
FIG. 5 illustrates a method by which a wireless communications device configured according to one embodiment of the present invention may operate.

FIG. 5 illustrates one embodiment of how device 10 might operate to either render audible sound or text to the user, depending upon the operating mode. Upon receiving the signal transmitted by the remote party, controller 24 determines whether device 10 is currently in the voice-to-text operating mode or audible operating mode (box 82). If device is in the audible operating mode, controller 24 feeds the received signal to audio processing circuit 22 for rendering through speaker 20 (box 84). However, if device 10 is in the voice-to-text mode, controller 24 feeds the signal to speech processor 30. Speech processor 30 analyzes the received signal (box 86), and converts the signal to corresponding text (box 88). Controller 24 then outputs the corresponding text to display 14 (box 90).

Figure 6:
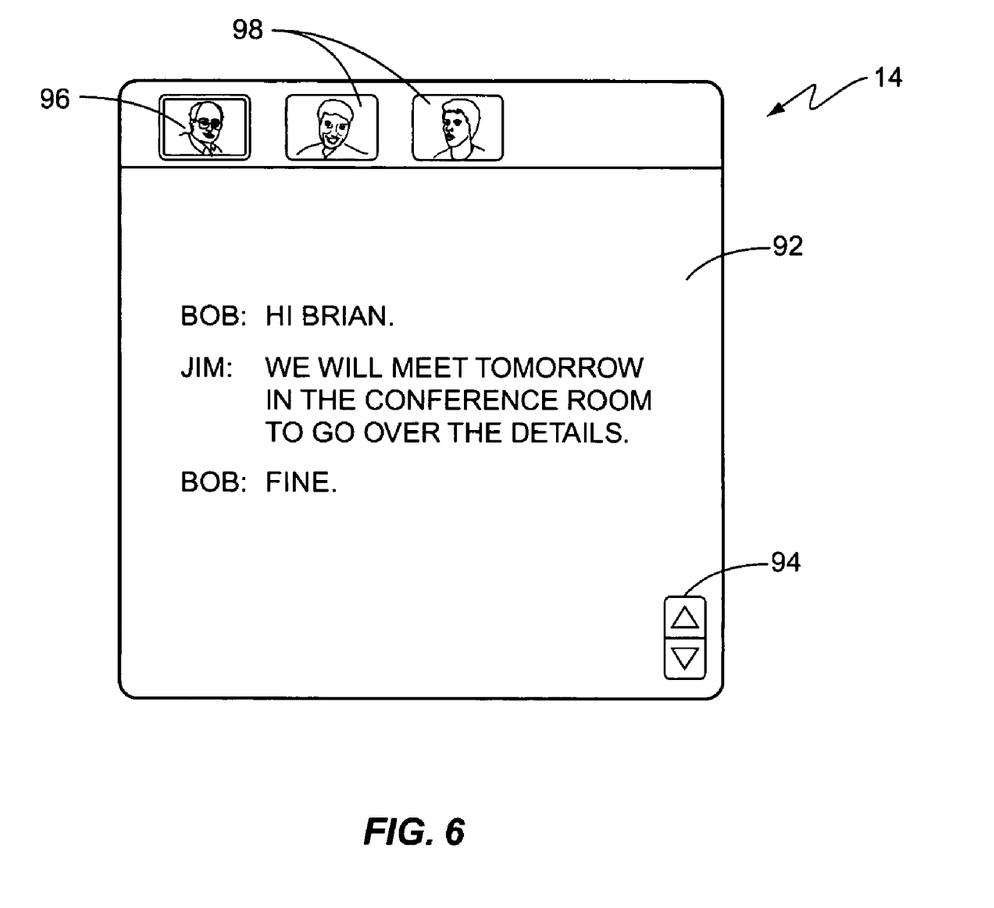
FIG. 6 illustrates a display showing text converted according to one embodiment of the present invention.

FIG. 6 illustrates how the user might view display 14 when device 10 is in the voice-to-text operating mode according to one embodiment of the present invention. Particularly, the converted text is displayed on a scrollable portion 92 of display 14. To assist the user in distinguishing between remote parties, the text may be prefaced with an indicator associated with a unique ID received from the remote parties. For example, the embodiment of FIG. 6 prefaces the text of each received transmission with a name that corresponds to the caller IDs of the remote parties. However, other methods of distinguishing the remote parties may also be used, such as using icons, pictures, or displaying the text in different colors for each user. As the text is displayed, controller 24 may also archive the converted text. This permits a user to easily scroll back and forth using scroll bar control 94. Of course, the amount of text archived by controller 24 may depend upon the amount of available memory 28. In one embodiment, the converted text is saved in a circular queue structure with the latest converted text replacing the oldest converted text.

In addition, display 14 may also comprise one or more graphical indicators 96, 98 representative of the remote parties with whom the user is communicating. The indicator 96 is highlighted in this embodiment, symbolizing that the remote party associated with indicator 96 is presently in a voice-to-text operating mode. Indicators 98, in contrast, are not highlighted, indicating that the remote parties associated with indicators 98 are in a conventional audible mode. The indication of whether a particular party is or is not in a voice-to-text operating mode may come from the remote party or from a server in the wireless communications network. In one embodiment, which will be described below in more detail, a presence server is used to track and report the operating mode of each device 10. Knowing whether one or more users are in the voice-to-text operating mode is useful as it might signal a transmitting party to speak more clearly, thereby minimizing the possibility of misinterpretation of his words on the receiving end by speech processor 30.

Thus, a receiving wireless communications device 10 may selectively convert speech signals transmitted by a remote party to text for display to the receiving party. However, the present invention is not limited solely to operation within the wireless communications device 10. In an alternate embodiment shown in FIG. 7, a server in a communications network provides the conversion capabilities and simply transmits the corresponding text to the receiving user device 10.

Figure 7:
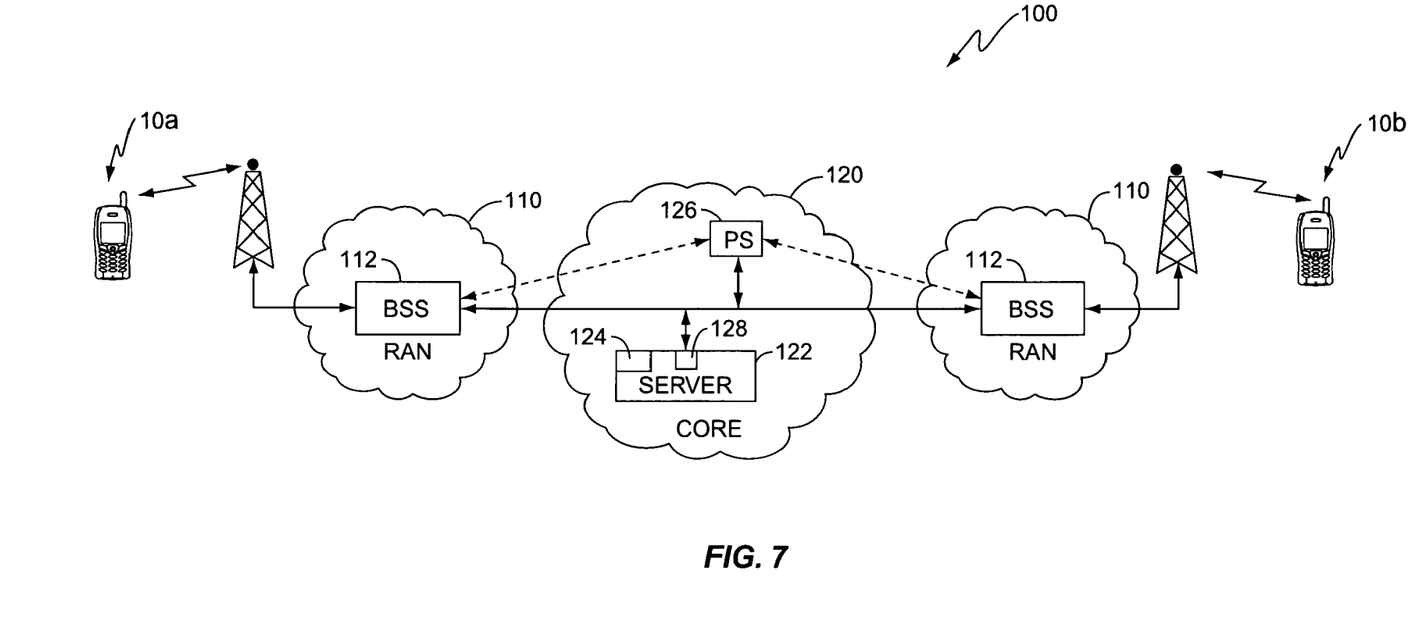
FIG. 7 shows an alternate embodiment of the present invention.

In this embodiment, two users, each having their own device 10a, 10b, may communicate via a wireless communications network 100. Both users connect and maintain a communication link to their respective Radio Access Networks (RAN) 110. One or more core networks 120 in turn may communicatively link the RANs 110.

The RANs 110 typically include a Base Station Subsystem (BSS) 112 that provides access to the network for devices 10a, 10b. RAN 110 may be, for example, a packet-switched network implementing the General Packet Radio Service (GPRS) standard developed for Global System for Mobile Communications (GSM) networks, though other standards may be employed. As is known in the art, BSS 112 may comprise or be otherwise linked to one or more Mobile Switching Centers, Radio Base Stations, antennas, Visitor Location Registers, Home Location Registers, Serving GPRS Support Nodes, Gateway GPRS Support Nodes, a Short Message Service Gateway MSC, and the like.

Core network 120 may also comprise a number of various known entities. However, according to an alternate embodiment of the present invention, core network 120 also includes a server 122. Server 122 includes transceiver circuitry 128, and may be communicatively linked to a presence server 126. Transceiver circuitry 128 may comprise, for example, one or more ports configured to send and receive data. In operation, server 122 receives a signal transmitted by the remote party associated with device 10a. The signal may or may not have been converted to a protocol usable by server 122 prior to receipt. In one embodiment, a speech processor 124 associated with server 122 analyzes the signal transmitted by the remote party 10a, and converts the signal to text corresponding to the words spoken by remote party 10a. Server 122 then sends the converted text to the user associated with device 10b as a short message. Controller 24 could then display the text to the user. This embodiment has the advantage of alleviating the demands placed on the resources (i.e., memory and processing power) available to the wireless communications device 10.

In addition, presence server 126 could report or broadcast each party's operating mode to each of the other parties. In one embodiment, presence server 126 provides a presence service that tracks and maintains subscribers' presence information. This includes, for example, the subscribers' status such as AWAY, OFF-LINE, CONNECTED, and DO NOT DISTURB. Presence server 126 publishes this presence information via signaling messages (e.g., NOTIFY signaling messages) to indicate a subscriber's communication status to other network entities and to other users. Generally, presence server 126 uses the Session Initiation Protocol (SIP) to communicate these types of messages; however, other protocols may also be employed in addition to, or in lieu of, SIP.

Presence server 126 is also configured to perform an additional function. Specifically, presence server 126 is apprised of the operating mode (e.g., audible mode and voice-to-text conversion mode) of each user. This can be accomplished, for example, via signaling between the user's device 10 and presence server 126 whenever the user's device 10 assumes one of the operating modes. Presence server 126 may then publish this operating mode in additional signaling messages to each of the parties communicating with the user of device 10. Using this presence information, controller 24 can control display 14 to indicate the operating mode of a remote party to the user of device 10. As previously described in FIG. 6, for example, display 14 may include images of the remote parties that are highlighted to indicate that a particular party is in a voice-to-text conversion mode.

Further, server 122 may also be configured to convert the transmitting party's speech signals to corresponding text based on the presence information supplied by presence server 126. In one embodiment, presence server 126 receives an indication that wireless communications device 10b has entered the voice-to-text operating mode. Responsive to this indication, presence server 126 may then signal an entity in RAN 110 and/or core network 120 to route any transmitted speech signals destined for device 10b to server 122. Speech processor 124 can then analyze and convert the signal to corresponding text before sending the text to wireless communications device 10b for display to the user.

Figure 8:
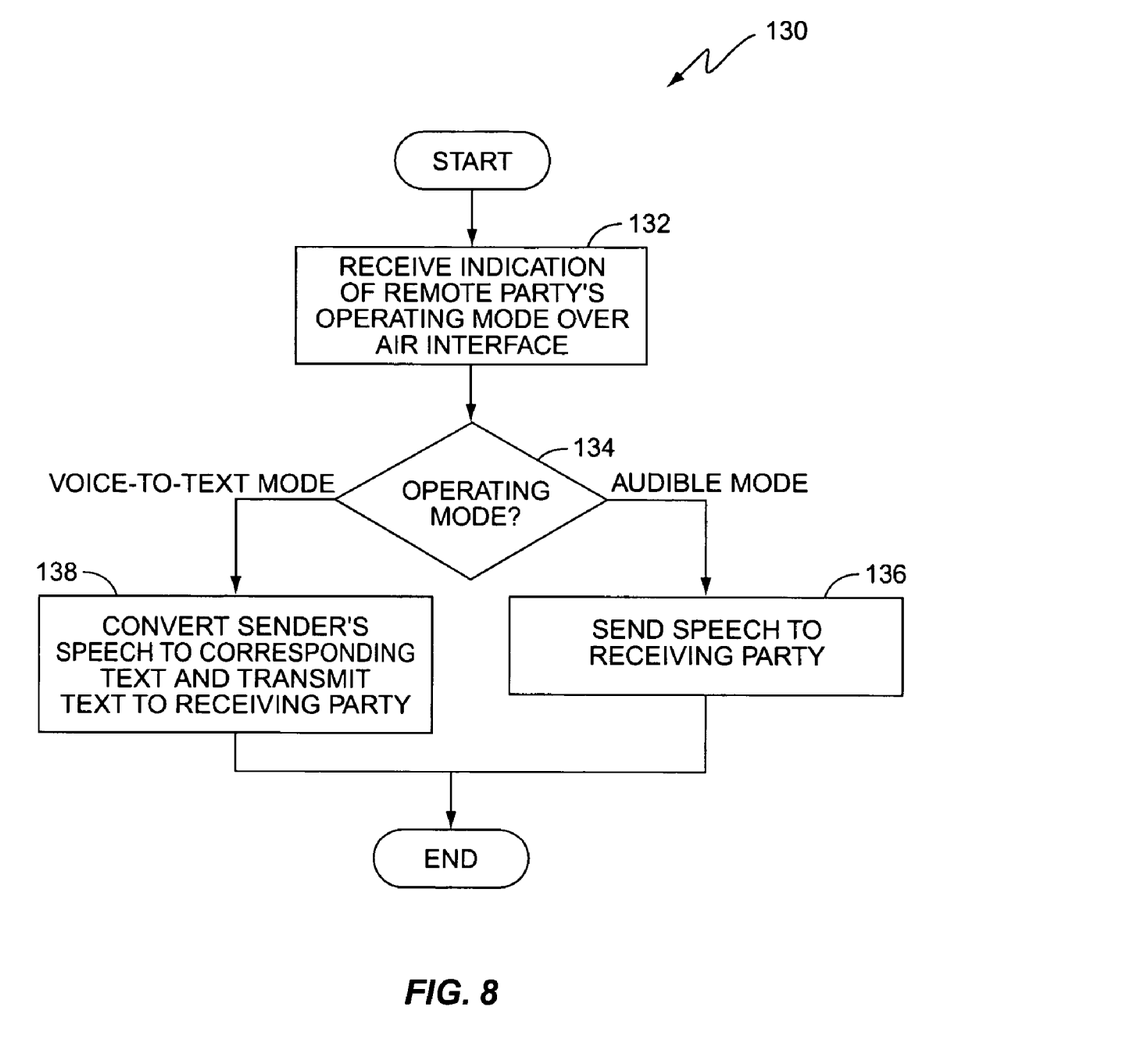
FIG. 8 shows another embodiment of the present invention wherein the calling party receives an indication of the receiving party's current operating mode.

In a similar manner, as seen in the embodiment of FIG. 8, the sending party's device may transmit voice or text depending upon the current operating mode of the remote party. In method 130, the sending party may receive an indication of the remote party's current operating mode over the air interface (box 132). The indication may be published or broadcast by presence server 126, or may be received directly from the remote party, for example, as one or more control bits in a message. If the indication indicates that the remote party is currently in an audible mode (box 134), the sending party's device could transmit speech signals (box 136). Conversely, if the remote party is currently in the voice-to-text mode (box 134), the speech processor 30 in the sending party's device could convert the sender's speech to corresponding text prior to transmission to the remote party (box 138). The receiving party would then receive and display the converted text on display 14. This embodiment could be useful, for example, wherein a remote party's wireless communications device 10 is not equipped for speech-to-text conversion.

Thus, the present invention permits users to read a sending party's spoken words on a display. However, those skilled in the art will readily appreciate that the present invention is not so limited. In alternate embodiments, the received signal carries audio from a voice message associated with the called party. For example, the voice message may be a message sent to the user of device 10 from a voice mail system. Alternatively, it may be a pre-determined audio message originating from the sending user's device 10 or a network entity, such as a switch or gateway. Regardless of where the audio originates, the present invention analyzes the received signal and displays the corresponding text for the user.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communications device comprising:
    a receiver to receive speech signals transmitted by a communication device of a remote party via a wireless communications network, the speech signals including information representative of the remote party's speech;
    a speech processing unit to convert the received speech signals to corresponding text based on an operating mode of the wireless communications device;
    a display to display information identifying the remote party, and the converted text to a user; and
    a controller configured to vary an appearance of the identifying information to indicate to the user whether the remote party's communication device is currently operating in either a voice-to-text operating mode or an audible sound operating mode.

2. The device of claim 1 wherein the controller is configured to selectively operate the user's wireless communications device in one of a voice-to-text operating mode and an audible sound operating mode.

3. The device of claim 2 wherein the controller is configured to select the operating mode responsive to a user command.

4. The device of claim 2 wherein the controller is configured to select the operating mode based on a comparison of an ambient audible noise level measured at the user's wireless communications device and a predetermined threshold.

5. The device of claim 2 wherein the controller is configured to select the operating mode responsive to a control signal received over an air interface.

6. The device of claim 2 wherein the controller is configured to save the converted text in memory.

7. The device of claim 6 wherein the controller is configured to cause the display to scroll through the saved converted text responsive to a user command.

8. A method of operating a wireless communications device comprising:
    receiving a speech signal transmitted by a communication device of a remote party over a wireless communications network, the speech signal having information representative of the remote party's speech;
    determining an operating mode of a user's wireless communications device;
    converting the received speech signal to corresponding text based on the determined operating mode;
    displaying information identifying the remote party, and the corresponding text to the user; and
    varying an appearance of the identifying information to indicate to the user whether the remote party's communication device is currently operating in either a voice-to-text operating mode or an audible sound operating mode.

9. The method of claim 8 wherein determining an operating mode comprises determining the operating mode of the user's wireless communications device to be one of an audible operating mode and a voice-to-text mode.

10. The method of claim 9 wherein the received speech signal is converted to corresponding text when the user's wireless communications device is in the voice-to-text operating mode.

11. The method of claim 9 further comprising automatically selectively placing the user's wireless communications device into the voice-to-text operating mode or the audible mode based on a comparison of an ambient audible noise level measured at the user's wireless communications device and a predetermined threshold.

12. The method of claim 9 further comprising selectively placing the user's wireless communications device into the voice-to-text operating mode or the audible mode based on user input.

13. The method of claim 9 further comprising selectively placing the user's wireless communications device into the voice-to-text operating mode or the audible mode responsive to a control signal received over an air interface.

14. The method of claim 8 further comprising archiving the converted corresponding text to memory in the user's wireless communications device.

15. The method of claim 14 further comprising retrieving the archived text to display to the user responsive to a user command.

16. A wireless communications device comprising:
    a transceiver to transmit signals to and receive signals from a remote party operating in one of a voice-to-text operating mode and an audible operating mode;
    a display to display information identifying the remote party;
    a controller to determine a current operating mode of a communications device associated with the remote party based on an indication received over an air interface, and to vary an appearance of the identifying information to indicate the current operating mode of the remote party's device based on the received indication; and
    a speech processor to convert audible sound associated with the user to corresponding text if the communications device associated with the remote party is in the voice-to-text mode.

17. The wireless communications device of claim 16 wherein the transceiver transmits the corresponding text to the remote party if the communications device associated with the remote party is in the voice-to-text operating mode.

18. The wireless communications device of claim 17 wherein the transceiver transmits the audible sound associated with the user to the remote party if the communications device associated with the remote party is in the audible operating mode.

19. A method of operating a wireless communications device comprising:
   receiving an indication over an air interface that indicates whether a wireless communications device associated with a remote party is operating in a voice-to-text operating mode or an audible operating mode;
   varying an appearance of information identifying the remote party on a display of a user's device to indicate the current operating mode of the remote party's device;
   converting audible sound to corresponding text based on the operating mode of the wireless communications device associated with the remote party; and
   displaying the converted text to the user.

20. The method of claim 19 wherein converting the audible sound comprises converting a user's speech into the corresponding text if the wireless communications device associated with the remote party is operating in the voice-to-text mode.

21. The method of claim 20 further comprising transmitting the corresponding text to the remote party if the wireless communications device associated with the remote party is operating in the voice-to-text mode.

* * * * *